United States Patent [19]

Commandeur et al.

[11] Patent Number: 4,557,507
[45] Date of Patent: Dec. 10, 1985

[54] VERTICAL SPIGOT JOINT

[75] Inventors: Jacobus J. Commandeur, Beverwijk; Jacob Felthuis, Oudorp; Piet Mantel, Alkmaar, all of Netherlands

[73] Assignee: Hoogovens Groep B.V., Ijmuiden, Netherlands

[21] Appl. No.: 533,558

[22] Filed: Sep. 19, 1983

[30] Foreign Application Priority Data

Sep. 30, 1982 [NL] Netherlands .......................... 8203795

[51] Int. Cl.[4] .............................................. F16L 27/12
[52] U.S. Cl. ........................................ 285/45; 285/295; 285/374; 285/DIG. 24; 277/DIG. 2; 277/DIG. 6
[58] Field of Search ............... 285/295, 284, 288, 289, 285/290, 292, 374, DIG. 24, DIG. 20, DIG. 16, 236, 297, 45; 277/72 FM, 236, DIG. 2, DIG. 6

[56] References Cited

U.S. PATENT DOCUMENTS

| 696,316 | 3/1902 | Corbin | 285/374 |
|---|---|---|---|
| 1,834,102 | 12/1931 | McCalley | 285/295 |
| 2,226,312 | 12/1940 | Kuhns | 285/295 |
| 2,661,500 | 12/1953 | Seymour et al. | 285/295 |
| 3,331,621 | 7/1967 | Bagnulo | 285/284 |
| 4,156,530 | 5/1979 | Rivkin et al. | 277/135 |
| 4,210,070 | 7/1980 | Tatum et al. | 98/40 D |
| 4,283,172 | 8/1981 | Syväkari | 110/336 |
| 4,373,377 | 2/1983 | Smith et al. | 285/97 |
| 4,417,344 | 11/1983 | Hogg, Jr. et al. | 373/93 |
| 4,490,092 | 12/1984 | Premont | 415/9 |

Primary Examiner—Cornelius J. Husar
Assistant Examiner—Eric K. Nicholson
Attorney, Agent, or Firm—Stevens, Davis, Miller & Mosher

[57] ABSTRACT

A vertical spigot joint for sealing the space between the socket and the end of a pipe inserted in the socket has an aluminium cord sealing the space and a filler mixture. The filler mixture comprises aluminium cement, vermiculite grains and a plastics material which retains its plastic properties in use. A sleeve of a glass fibre cloth coated with protective layers covers the joint and is secured to the pipe end and socket by silicone putty and by clamping strips. A thermally insulating refractory ceramic felt is provided between the pipe end and the filler material. The use of this filler mixture, together with the provision of the sleeve enables a joint to be produced which is gas-tight and absorbs relative movement of the pipe end and socket due to the media in the pipe or due to thermal expansion and contraction.

12 Claims, 1 Drawing Figure

VERTICAL SPIGOT JOINT

BACKGROUND OF THE INVENTION

Field of the Invention

The present invention relates to a vertical spigot joint. The joint seals the space between a generally upwardly directed socket and a pipe filling in the socket.

Such a joint is used, for example, to seal the connection of a metal riser pipe to a socket in a metal gas collecting main in a coke-oven battery. Gases derived from coking coals are discharged from the main through such riser pipes, usually being cooled by a water scrubber close to the spigot joint. The gases contain hydrocarbons, chlorine compounds and sulphur and it is the purpose of the spigot joint to prevent gas leaking from the joint, as this could give rise to unacceptable working conditions and to considerable environmental pollution.

However the riser pipes and the gas mains are connected to different structures and the forces caused by the passage of a medium of variable pressure and temperature, and the thermal expansion and contraction of the pipe and socket causes relative movement of the pipe and socket. In the case of the riser pipe of a coke-oven battery this movement may be of the order of 10 mm in both the horizontal and vertical directions. The joint must be able to prevent gas leakage from the joint despite the movement of the pipe and socket.

Attempts have been made to find a reliable joint for sealing the pipe to the socket but none of these has been completely successful.

SUMMARY OF THE INVENTION

The present invention seeks to provide a vertical spigot joint which provides a satisfactory seal between a pipe and a socket which are subject to forces due to thermal expansion and contraction and/or due to the passage of media of variable pressure and temperature.

The present invention proposes filling the space between the pipe and socket with a filler mixture of aluminium cement, vermiculite grains and a plastics material which retains its plastic properties in use. A sealing ring, which is preferably an aluminium cord with a diameter of e.g. 40 mm, is provided between the pipe and the socket below the filler mixture to prevent leakage of the latter. It has been found that this filling mixture, when combined with a sleeve, is sufficiently flexible to absorb movements of the pipe and socket with the joint remaining gas tight.

A sleeve covers the space, and hence the filler mixture, the sleeve being secured in a gas tight manner to the pipe and to the socket. The sleeve is preferably a glass fibre cloth. It is possible to manufacture the sleeve in one closed, circular piece, but preferably the sleeve is formed from a flat collar, cut to shape, which is bent to form a closed sleeve. The ends of this collar are secured to each other by means of silicone putty. The properties of the glass fibre cloth may be selected in dependence upon the intended use and operating conditions, but generally it seems that the best results, for most applications, are obtained with a glass fibre cloth having a mass per unit area of 0.6 to 1.0 kg m$^{-2}$.

Protective coatings may be provided on the sleeve, both on the side furthest from the filler material (the outer surface) and the side nearest the filler material (the inner surface). The protective coating on the outer surface should protect the joint against mechanical damage and/or moisture penetration. A suitable coating is one comprising a mixture of silicone resin and a titanium ester. Such a mixture is commercially available from the Dutch company Zandleven under the name "Aqvisil-metalcoat". The coating on the inner surface should protect the sleeve against gas escape, chemical and/or thermal damage. A suitable coating includes a layer of silicone putty and a layer of aluminium foil. The putty may be, for example that commercially available from The General Electric Co. under the name "RTV 159". Good results are obtained with an aluminium foil 0.025 mm thick. The coating on the inner surface may also include a layer of a mixture of silicone resin and a titanium ester as used in the coating on the outer surface.

When glass fibre is used to form the sleeve, additional coating layers may be provided on one or both surfaces of the glass fibre. Thus a layer of metal or of a silicone rubber resistant to high temperature may be provided immediately adjacent the glass fibre. Glass fibre cloth with coating layers of these materials is commercially available. The metal covering may be produced by evaporating aluminium onto a glass fibre cloth.

If the temperature of the inserted pipe may increase to approximately 300° C., it is preferable that the filling mixture is screened from the pipe with a thermally insulated layer of refractory ceramic felt. The felt is secured to the free end of the pipe by putty. For example, a refractory felt 3 mm thick can be used for this, and is secured by putty to the pipe by means of a refractory putty.

The filling material should remain sufficiently plastic, under operating conditions, to be able to absorb the movement of the pipe and socket without deteriorating at the prevailing temperature, and without the socket being forced out of the filling in the event of excess pressure in the pipe. If a thermally insulating layer of refractory ceramic felt is installed at the free end of the inserted pipe, it is possible for the filling to continue being used even at high temperature in the pipe. In particular, good results are obtained with a socket filling consisting of 10 to 13% by volume of aluminium cement, 52 to 66% by volume of vermiculite grains, with a grain size of 6 mm, 6.5 to 8.5% plastics material, e.g. a softener-free, highly viscous type of tricopolymeric emulsified synthetic resin. The balance of the mixture is water. The water may evaporate after the socket filling is installed. Such a synthetic resin component is sold, for example, under the trade name of "Seal All".

It is important that the sleeve be fitted on the pipe ends so that it is thoroughly gas tight. This can be achieved by securing the sleeve to the pipe ends with silicone putty, which must be resistant to a temperature of at least 260° C., and must have a peak thermal load of at least 310° C. The silicone putty may be the same as that used on the outer surface of the sleeve. The sleeve may also be secured by means of clamps. These clamping means should preferably consist of a clamping strip made from corrosion-resistant steel. These types of clamping strips are commercially available.

BRIEF DESCRIPTION OF THE DRAWING

An embodiment of the invention will now be described in detail, by way of example, with reference to the accompanying drawing in which.

DETAILED DESCRIPTION OF THE PREFERRED EMBODIMENT

Figure 1:
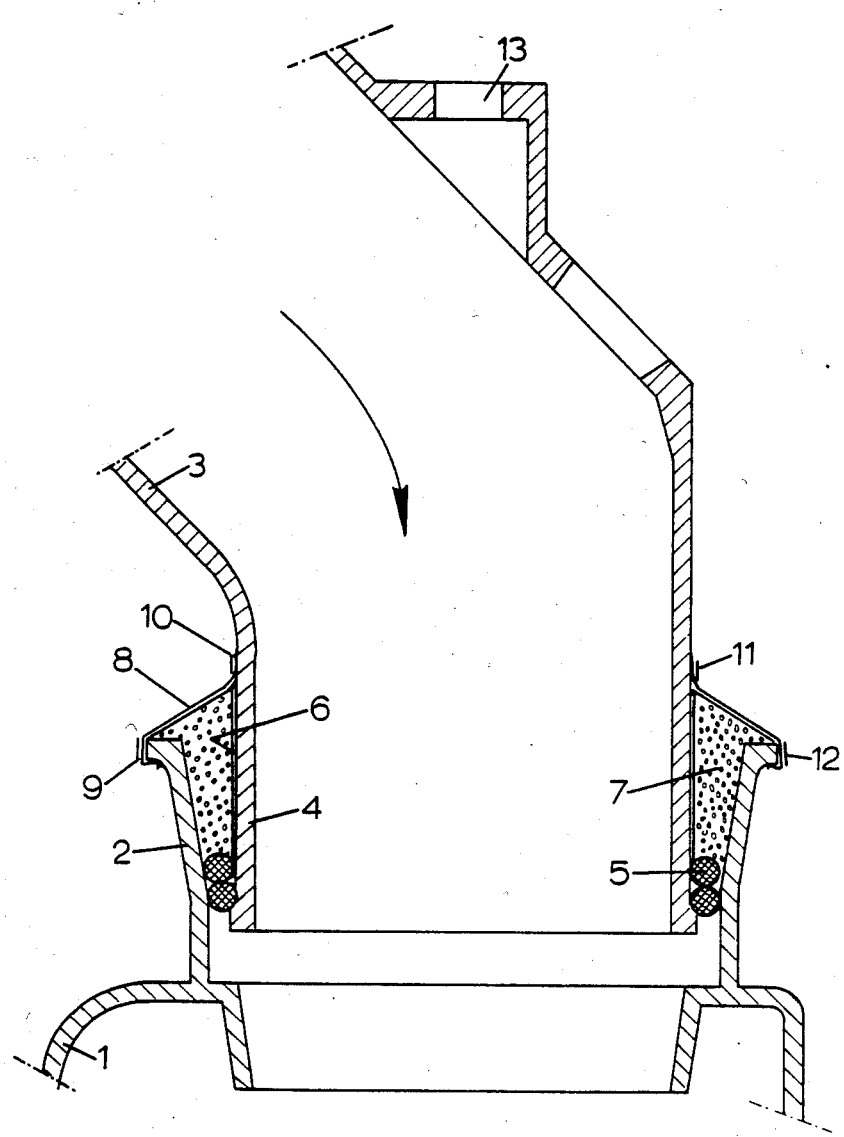
FIG. 1 shows a vertical spigot joint according to the present invention between a riser pipe and a gas collecting main of a coke-oven battery.

Referring to FIG. 1, a metal gas collecting main 1 of a coke-oven battery has a plurality of sockets along its length, one of which is shown at 2. One end 4 of a metal riser pipe 3 projects into the socket 2. A stream of contaminated gas flows down through the riser pipe 3 into the gas collecting main 1 for discharge in the transverse direction.

Washing water can be injected into the riser pipe 3 through inlet 13 for removing some of the entrained dust and tar droplets from the gas.

The gas-collecting main 1 is secured separately from the fastening of the riser pipes 3. As a result of this inserted pipe-end 4 and socket 2 may move considerable distances relative to each other, in both the vertical and the horizontal directions, under the varying temperatures and pressures occurring in the pipe system.

Two rings or loops of 40 mm aluminium cord 5 are fitted around the end 4 of the pipe 3 and extend to the socket 2 to seal the space between end 4 and the socket 2. A 3 mm thick layer of refractory ceramic felt 6 is provided around the end 4 of the pipe 3, above the aluminium cord 5.. The felt 6 is stuck to the pipe 3 by refractory putty. The space between the socket 2 and the end 4 of the pipe 3 is also filled with a filler mixture 7 of 22% water, 7.5% Seal All, 11.5% aluminium cement and 59% vermiculite grains. (The percentages given are expressed as percentages by volume). As is generally known, vermiculate grains consist of expanded mica, and a grain size varying from 0 to 6 mm is preferable. As already mentioned, the product Seal All consists of a tricopolymeric highly viscous emulsified synthetic resin, which is free from softener.

It should be noted that after filling material has been added, the water present is evaporated due to the material being heated from the hot inserted pipe.

The filler mixture 7 is covered with a sleeve 8 of glass-fibre cloth which is secured at points 9 and 10 on the edge of the socket 2 and the cylindrical face of the end 4 of the pipe 3 respectively. The securing of the sleeve 8 to the socket 2 and pipe end 4 may be achieved using silicone putty of the type described above. The securing of the sleeve 8 to the socket 2 and pipe end 4 is further reinforced by fitting stainless steel clamping strips 11 and 12 around the sleeve 8 where it overlaps the pipe end 4 and socket 2 respectively.

The sleeve 8 is obtained by crimping over a flat strip. The ends of this strip are then overlapped and connected, at the point of overlap with silicone putty. The glass-fibre cloth 8 used is preferably one of three types namely aluminium impregnated glass-fibre cloth, glass-fibre cloth with aluminium evaporated onto one side, and a glass-fibre cloth which is coated on two sides with a high temperature resistant silicone rubber. In this case the outer and inner surfaces of the cloth are provided with a number of other protective coating layers, good results being achieved in practice with three variants, namely:

Variant A (from the outer surface to the inner surface)
1. "Seal All"
2. glass fibre cloth with a mass per unit area of 0.8 kg m$^{-2}$
3. aluminium foil 0.025 mm thick
4. silicone putty Variant B
1. metal coating, consisting of a mixture of silicone resin and a titanium ester resistant to temperatures of up to 600° C.
2. glass-fibre cloth, of the type marketed as fireproof cloth, which is impregnated with aluminium
3. silicone putty
4. aluminium foil Variant C
1. metal coating, as in variant B
2. glass fibre cloth coated on two sides with silicone rubber
3. silicone putty
4. aluminium foil
5. metal coating The Seal All or metal coating protects the sleeve 8, and hence the rest of the joint against mechanical damage and/or moisture protection. The layers on the inner surface of the glass fibre cloth protect the sleeve 8 against escaping gas, chemical and/or thermal damage.

Although described in connection with the jointing of a riser pipe to a gas connecting main of a coke-oven battery, the present invention is not limited to such an application and is applicable to the joining of any pipe to a socket.

What is claimed is:

1. A vertical spigot joint between a generally upwardly directed socket and a pipe adapted to fit in said socket, said socket and said pipe defining a space therebetween, said spigot joint comprising:
   a sealing ring for sealing said space, said sealing ring extending between said pipe and said socket;
   a filler mixture filling said space above said sealing ring, said filler mixture comprising aluminium cement, vermiculite grains, and a plastics material which retains its plastic properties in use;
   and a flexible sleeve covering said space, said sleeve being secured to said pipe and said socket so that it is gas tight.

2. A spigot joint according to claim 1, wherein said sleeve is a glass fibre cloth.

3. A spigot joint according to claim 2 wherein said glass-fibre cloth has a mass per unit area of 0.6 to 1.0 kg m$^{-2}$.

4. A spigot joint according to claim 1 wherein a first protective coating is provided on the surface of said sleeve furthest from said filler mixture and a second protective coating is provided on the surface of said sleeve nearest said filler mixture.

5. A spigot joint according to claim 4 wherein said second protective coating includes a layer of silicone putty and a layer of aluminium foil.

6. A spigot joint according to claim 4, wherein said first protective coating includes a coating mixture of silicone resin and a titanium ester resistant to temperatures of up to 600°.

7. A spigot joint according to claim 1 wherein a thermally insulating refractive ceramic felt is provided between said pipe and said filler mixture.

8. A spigot joint according to claim 1, wherein said sealing ring is an aluminium cord.

9. A spigot joint according to claim 1 wherein said filler mixture comprises 10% to 13% by volume of aluminium cement, 52% to 66% by volume of vermiculite grains with a grain size up to 6 mm, 6.5 to 8.5% by volume of plastics material, and the balance water.

10. A spigot joint according to claim 1, wherein said plastics material is a softener-free, highly viscous, tricopolymeric emulsified synthetic resin.

11. A spigot joint according to claim 1, wherein silicone putty secures said sleeve to said pipe and to said socket so that it is gas tight, said silicone putty being resistant to temperatures of at least 260° C. and having a peak thermal loading of at least 310° C.

12. A spigot joint according to claim 1 having steel clamping strips clamping said sleeve to said pipe and said socket respectively.

* * * * *